US006636149B2

(12) United States Patent

Moon

(10) Patent No.: US 6,636,149 B2
(45) Date of Patent: Oct. 21, 2003

(54) DRIVING PRACTICE DISPLAY DEVICE OF SURROUNDING VEHICLES

(75) Inventor: Seung-Ki Moon, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 21 days.

(21) Appl. No.: 09/983,317

(22) Filed: Oct. 24, 2001

(65) Prior Publication Data

US 2002/0080047 A1 Jun. 27, 2002

(30) Foreign Application Priority Data

Dec. 26, 2000 (KR) ........................................ 2000-81548

(51) Int. Cl.$^{7}$ .................................................. B60Q 1/00

(52) U.S. Cl. ........................ 340/439; 340/435; 340/576; 340/903

(58) Field of Search ................................ 340/903, 435, 340/439, 988, 995, 990, 576; 701/301, 213

(56) References Cited

U.S. PATENT DOCUMENTS 5,521,580 A * 5/1996 Kaneko et al. ............. 340/439
5,570,087 A * 10/1996 Lemelson ................... 340/439
5,835,008 A * 11/1998 Colemere, Jr. .............. 340/439
6,154,123 A * 11/2000 Kleinberg ................... 340/436
6,326,903 B1 * 12/2001 Gross et al. ................ 340/988
6,502,035 B2 * 12/2002 Levine ....................... 340/465

* cited by examiner

*Primary Examiner*—Brent A. Swarthout
(74) *Attorney, Agent, or Firm*—Birch, Stewart, Kolasch & Birch, LLP

(57) ABSTRACT

A driving practice display device of surrounding vehicle, the device comprising: a Global Positioning System (GPS) unit for grasping positions of his or her own vehicle and surrounding vehicles; a driving practice grasping unit for grasping his or her own driving practice; a data transceiving unit for transmitting to each surrounding vehicle his or her driving practice data grasped by the driving practice grasping unit and for receiving driving practice data transmitted from the surrounding vehicles; and a control unit for displaying on a display unit positions of his or her vehicle and surrounding vehicles grasped by the GPS unit and for displaying on the display unit the driving habits of each surrounding vehicle based on the driving practice data of the surrounding vehicle received from the data transceiving unit, such that the driver can recognize the driving practice of the surrounding vehicle, thereby providing a safe driving to the driver.

3 Claims, 4 Drawing Sheets

DRIVING PRACTICE DISPLAY DEVICE OF SURROUNDING VEHICLES

BACKGROUND OF THE INVENTION

1. Field of the Invention

The present invention relates to a driving practice display device of surrounding vehicles, and more particularly to a driving practice display device of surrounding vehicle adapted to grasp driving practices of surrounding vehicles while a driver is driving a vehicle, thereby enabling to display the driving practices of each surrounding vehicle on the driver's own display device.

2. Description of the Prior Art

As the number of vehicles surges recently, safety and traffic accidents are also increased while vehicles are running. Among the safety and traffic accidents occurring while the vehicles are running, incorrect driving habits occupy the lion's share thereof.

As one of the preventive measures thereto, a driving practice grasping system has been developed in which a driving practice is grasped and a driver is warned so as to acquire a correct driving practice when the driver drives recklessly.

A known driving practice grasping system includes "a reckless driving prevention method" filed by the present applicant in 1996 and disclosed in 1998 via Korea Patent Gazette 1998-054803 and "a reckless driving warning method" disclosed via Korea Patent Gazette 1998-060123.

The reckless driving prevention method as illustrated in FIG. 3 includes the steps of calculating a driving practice of an expert or a skilled driver for a standard data (step S11), testing the standard data on various kinds of vehicle to calculate a control reference data (steps 12 and 13), storing the control reference data in a central controller and receiving data acquired while a vehicle is running to comparatively analyze same (steps 14 and 15), and warning a reckless driving according to the comparative analysis and recommending to drive normally when the control reference data is within an allowable scope (steps 16, 17 and 18).

The reckless driving warning method as illustrated in FIG. 4 consists of the steps of detecting various running information obtainable while a vehicle is running (step S10), using a neural network circuit theory to generate a parameter for discriminating a driving practice data and using fuzzy control to select a driving practice data for formation of driving practice data of a driver (steps S20 and S30), comparing the driving practice of the driver with a normal driving habit to discriminate whether the driver's driving practice is reckless (steps S40 and S50) and giving a warning to the driver if the driver's driving practice is wild (step S60).

However, there is a problem in the driving practice grasping systems thus described according to the prior arts in that a driving practice of a vehicle owner is just grasped and, in case of reckless driving, a warning is given to the vehicle owner to enable to acquire a correct driving practice such that safety and traffic accidents occurring due to bad driving habits of each surrounding vehicle cannot be prevented. In other words, accidents caused by a reckless driver of a surrounding vehicle cannot be prevented even if a driver performs a defensive driving.

SUMMARY OF THE INVENTION

The present invention is disclosed to solve the aforementioned problems and it is an object of the present invention to provide a driving practice display device of surrounding vehicles adapted to grasp driving practices of each surrounding vehicle and display same on a driver's own display device while the driver is running his or her vehicle such that the driver can recognize the driving practice of the surrounding vehicles, thereby providing a safe driving to the driver.

In accordance with the object of the present invention, there is provided a driving practice display device of surrounding vehicles, the device comprising:

- a Global Positioning System (GPS) unit for grasping positions of his or her own vehicle and surrounding vehicles;
- a driving practice grasping unit for grasping his or her own driving practice;
- a data transceiving unit for transmitting to each surrounding vehicle his or her driving practice data grasped by the driving practice grasping unit and for receiving driving practice data transmitted from the surrounding vehicles; and
- a control unit for displaying on a display unit positions of his or her vehicle and surrounding vehicles grasped by the GPS unit and for displaying on the display unit the driving habits of each surrounding vehicle based on the driving practice data of the surrounding vehicle received from the data transceiving unit.

The driving practice display device of surrounding vehicles further comprises a manipulating switch which is turned on and turned off in response to manipulation of a driver, wherein the control unit serves to perform a function of displaying driving habits of each surrounding vehicle when the manipulating switch is turned on, and when the manipulating switch is turned off the control unit does not perform the function of displaying the driving habits of each surrounding vehicle.

Furthermore, the control unit displays on the display unit each surrounding vehicle in different color in displaying each driving practice of the surrounding vehicles.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Preferred embodiment of the present invention will now be described in detail with reference to the accompanying drawings.

Figure 1:
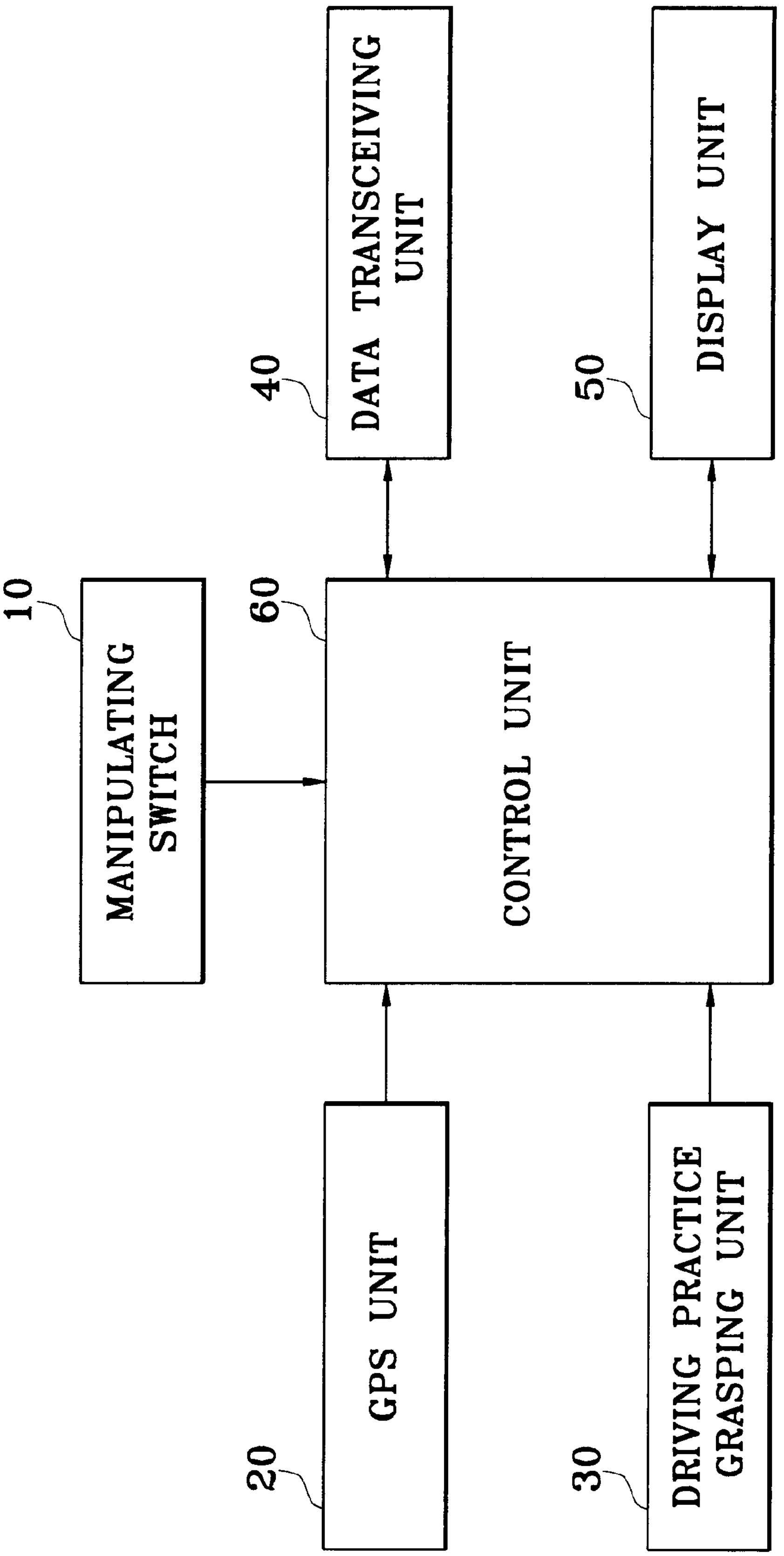
FIG. 1 is a schematic block diagram of a driving practice display device of surrounding vehicles according to the present invention.

FIG. 1 is a schematic block diagram of a driving practice display device of surrounding vehicles according to the present invention where reference numeral 10 is a manipulating switch, 20 is a GPS unit, 30 is a driving practice grasping unit, 40 is a data transceiving unit, 50 is a display unit and 60 is a control unit.

The manipulating switch 10 is a switch which is turned on or turned off in response to manipulation of a driver. When the manipulating switch 10 is turned on in response to the manipulation of the driver, the control unit 60 activates a driver practice display device of surrounding vehicles according to the present invention, and when the manipulating switch 10 is turned off, the control unit 60 deactivates operation of the driving practice display device of surrounding vehicles according to the present invention.

The GPS unit 20, a terminal of GPS equipped at a vehicle, grasps positions of his or her own vehicle and surrounding vehicles to send data thereof to control unit 60. At this time, it should be apparent that a navigation system mountable to a vehicle may be used instead of the GPS unit 20.

The driving practice grasping unit 30 grasps a driving habit of his or her own vehicle to send same to the control unit 60.

The driving practice grasping unit 30 classifies into Good, Reckless and the like the driving habits of each driver based on each information detected by various sensors but detailed explanation thereto is omitted because of disclosure in the prior arts of the present invention.

The data transceiving unit 40 transmits to surrounding vehicles the driving practice data of his or her own vehicle grasped by the driving practice grasping unit 30 and receives the driving practice data transmitted from the surrounding vehicles to send same to the control unit 60. At this time, the data transceiving unit 40 transmits and receives data via networks such as radio Local Area Network (LAN) and the like.

Furthermore, the control unit 60 controls the data transceiving unit 40 for transmitting to surrounding vehicles the driving practice data of his or her vehicle input from the driving practice grasping unit 30 and also displays on the display unit 50 positions of his or her vehicle and the surrounding vehicles grasped by the GPS unit 20.

At this same time, the control unit 60 displays on the display unit 50 the driving habits of surrounding vehicles made on the driving practice data of surrounding vehicles received by the data transceiving unit 40.

At this time, the control unit 60 displays on the display unit 50 each driving practice of surrounding vehicles in different colors whereby, by way of example, reckless practices are colored in red while vehicles of normal practices are colored in blue.

Now, operational effect of driving practice display device of surrounding vehicles thus described according to the present invention will be explained in detail as below.

First of all, when a driver turns on the manipulating switch 10 while driving a vehicle, the control unit 60 displays on the display unit 50 positions of his or her vehicles and surrounding vehicles grasped by the GPS unit 20.

The control unit 60 transmits to the surrounding vehicles via the data transceiving unit 40 the driving practice data of his or her vehicles grasped by the driving practice grasping unit 30 and displays the driving habits on the display unit 50 based on the driving practice data of surrounding vehicles received from the surrounding vehicles through the data transceiving unit 40.

Figure 2:
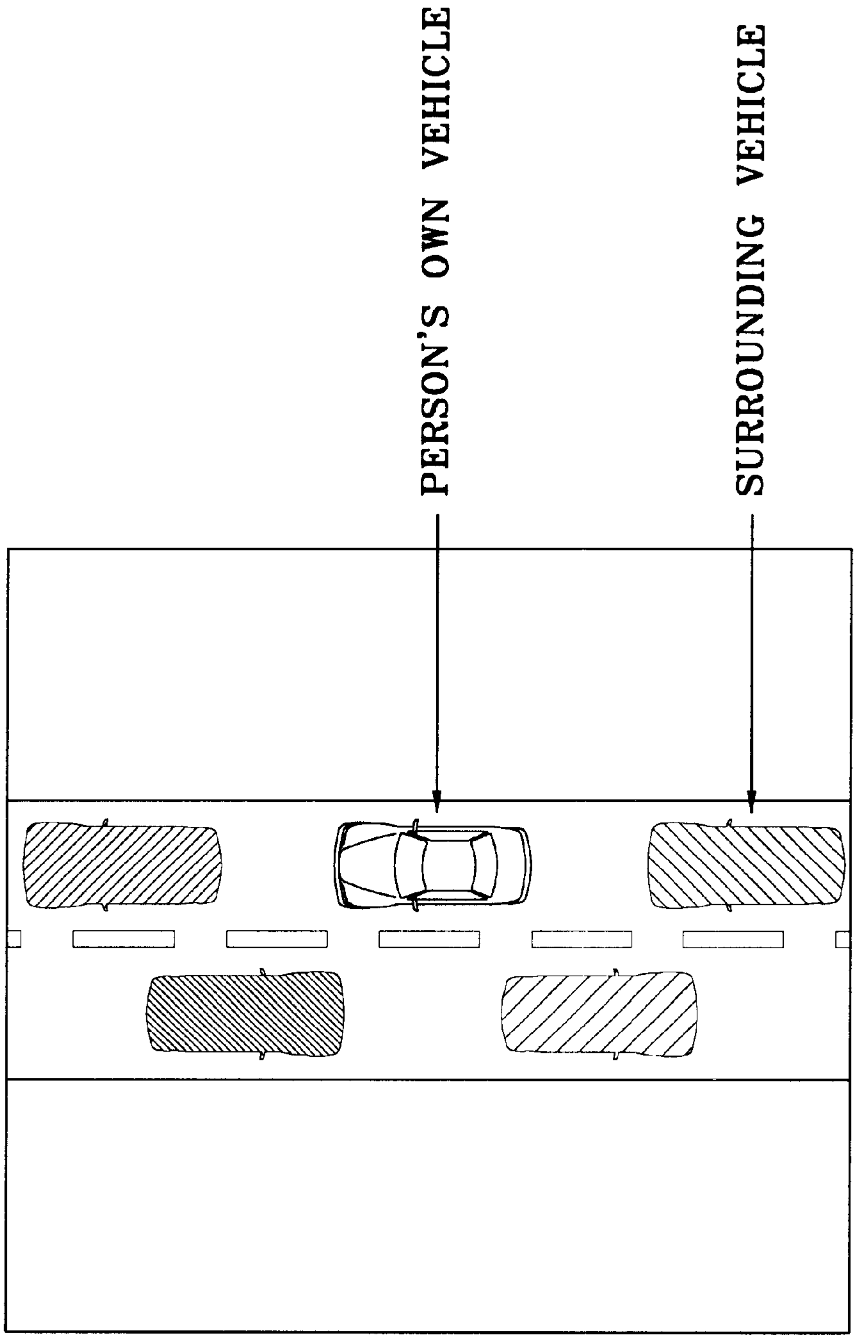
FIG. 2 illustrates a screen displayed on a driving practice display device of surrounding vehicles according to the present invention.
Figure 3:
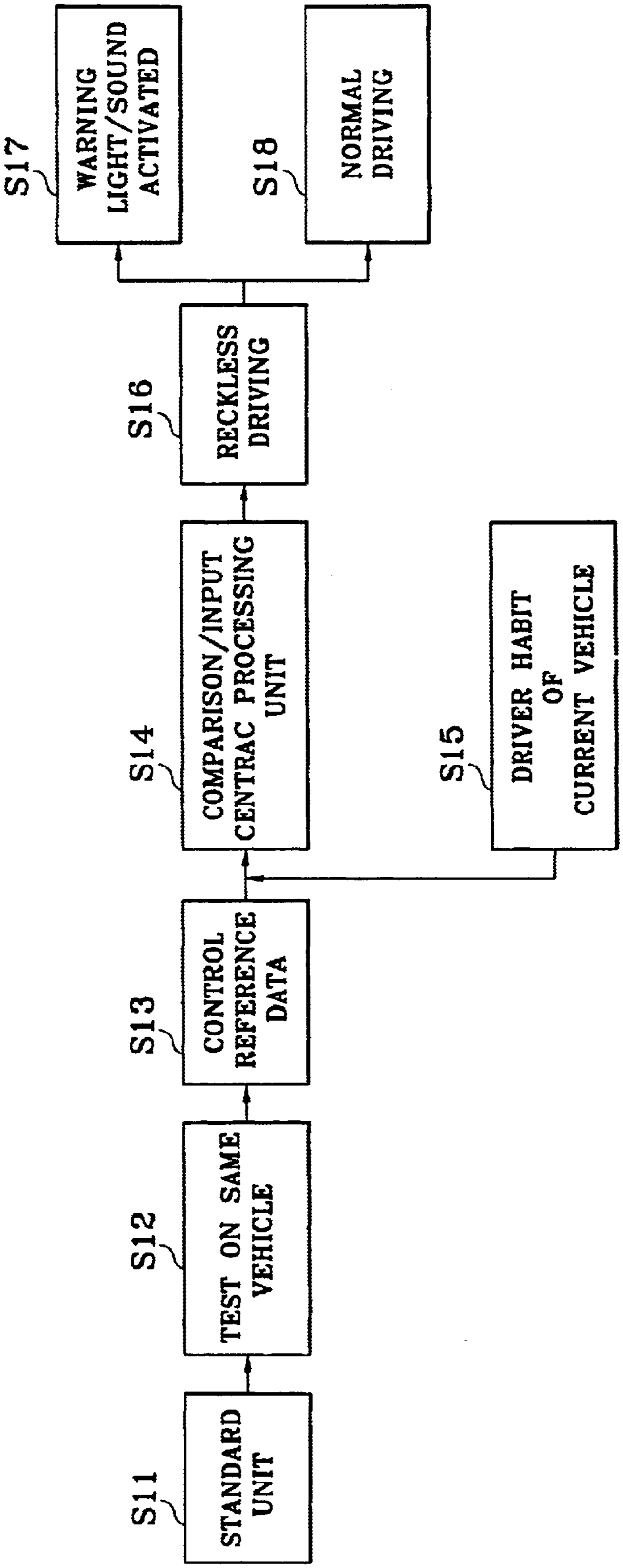
FIG.3 (Prior art)
FIG. 3 is a sequential flow chart for describing a driving practice grasping system according to a first embodiment of the prior art.
Figure 4:
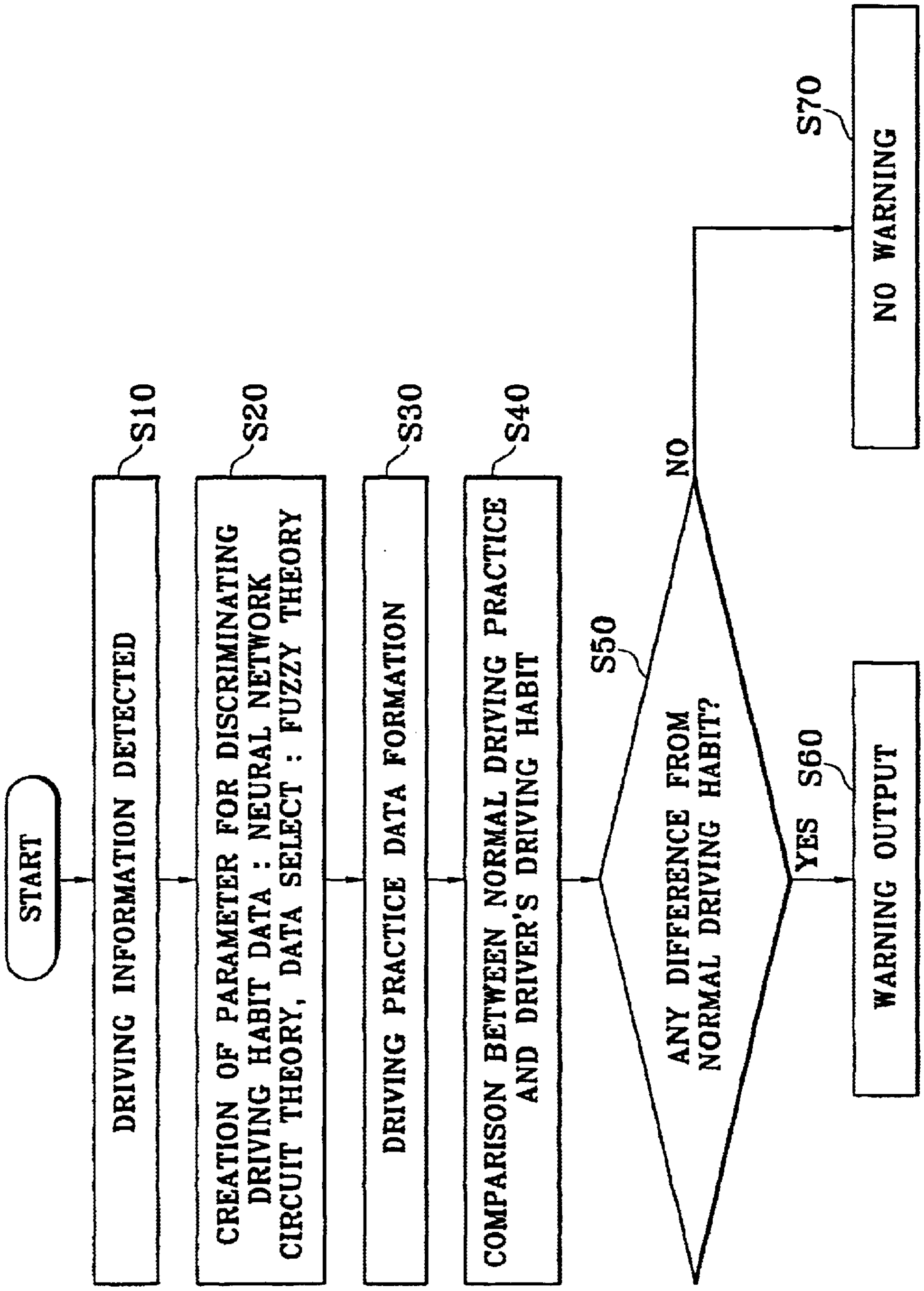
FIG.4 (Prior art)
FIG. 4 is a sequential flow chart for describing a driving practice grasping system according to a second embodiment of the prior art.

By way of example, as illustrated in FIG. 2, surrounding vehicles of reckless driving practices are shown in red color while those of good driving habits are displayed in blue.

As apparent from the foregoing, there is an advantage in the driving practice display device of surrounding vehicles thus described according to the present invention in that driving habits of running surrounding vehicles are grasped to be displayed on a display device of his or her own vehicle, such that a driver can recognize the driving practices of the surrounding vehicles to the benefit of the driver for safe driving.

What is claimed is:

1. A driving practice display device of surrounding vehicles, the device comprising:

a Global Positioning System (GPS) unit for grasping positions of his or her own vehicles and surrounding vehicles;

a driving practice grasping unit for grasping his or her own driving practice;

a data transceiving unit for transmitting to each surrounding vehicle his or her driving practice data grasped by the driving practice grasping unit and for receiving driving practice data transmitted from the surrounding vehicles, said driving practice data including directional data created by a driver and other data reflecting good or reckless driving practices; and a control unit for displaying on a display unit positions of his or her vehicle and surrounding vehicles grasped by the GPS unit and for displaying on the display unit the driving habits of each surrounding vehicles based on the driving practice data of the surrounding vehicle received from the data transceiving unit.

2. The device as defined in claim 1 further comprising a manipulating switch which is turned on and turned off in response to manipulation of a driver, wherein the control unit serves to perform a function of displaying driving habits of each surrounding vehicle when the manipulating switch is turned on, and when the manipulating switch is turned off the control unit does not perform the function of displaying the driving habits of each surrounding vehicle.

3. The device as defined in claim 1 or 2, wherein the control unit displays on the display unit each surrounding vehicle in different color in displaying each driving practice of the surrounding vehicles.

* * * * *